Aug. 1, 1967  P. J. GROGAN  3,333,357
TRANSPARENCY WITH ORIENTATION MEANS
Filed Oct. 22, 1964  2 Sheets-Sheet 1
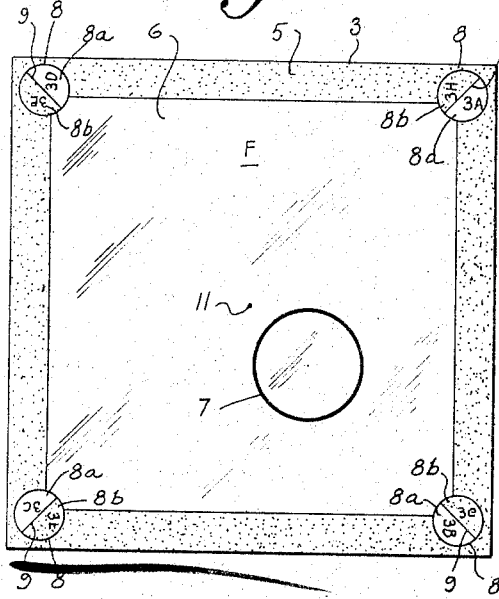
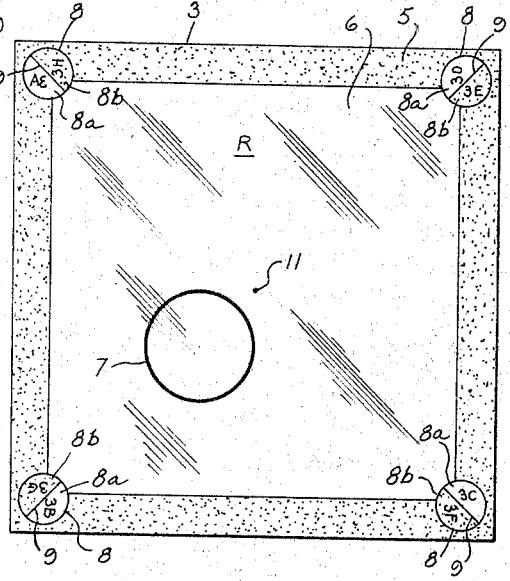
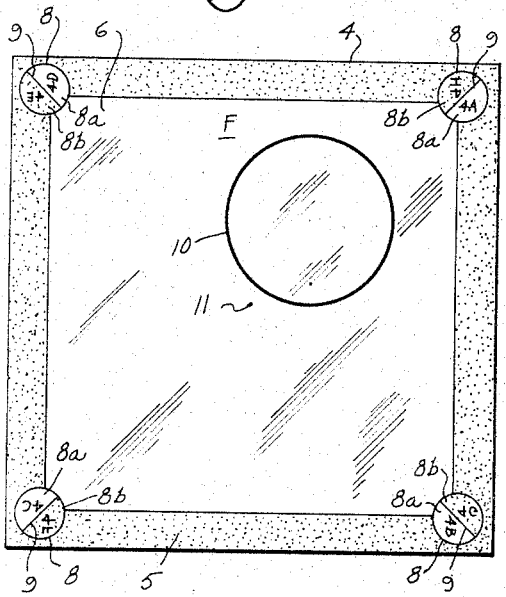
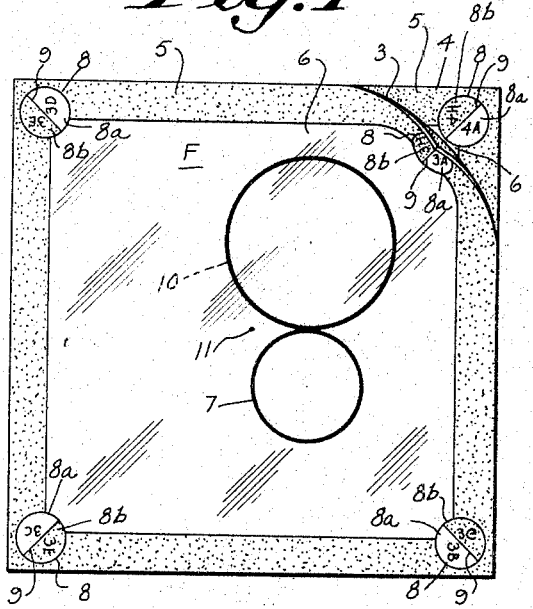
INVENTOR
PAUL J. GROGAN
BY
ATTORNEY Aug. 1, 1967   P. J. GROGAN   3,333,357
TRANSPARENCY WITH ORIENTATION MEANS
Filed Oct. 22, 1964   2 Sheets-Sheet 2
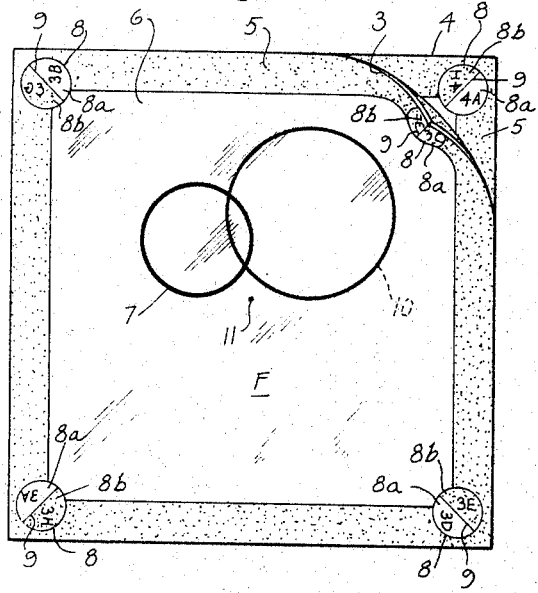
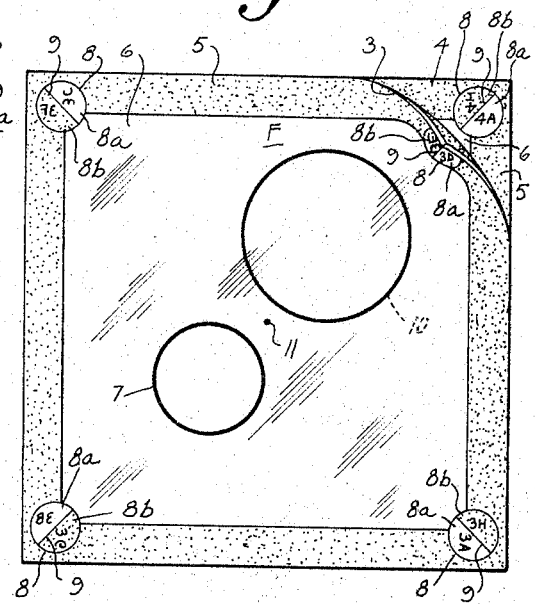
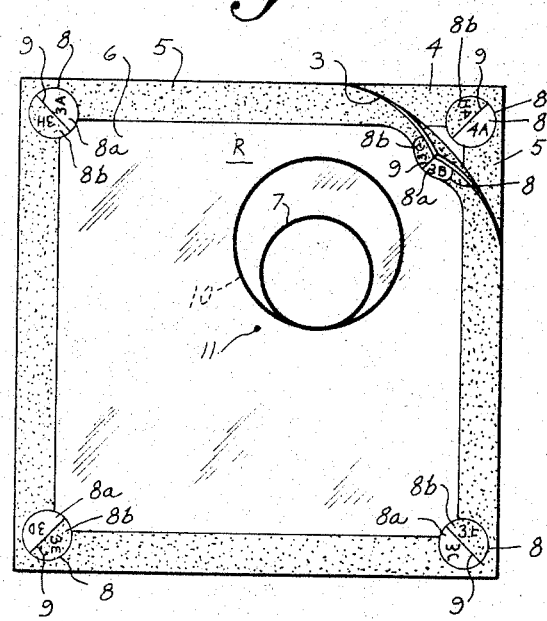
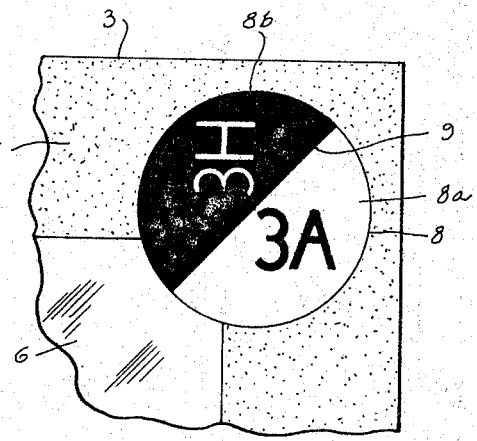
INVENTOR
PAUL J. GROGAN
BY   *Donald J. Casser*
ATTORNEY

United States Patent Office 3,333,357
Patented Aug. 1, 1967

3,333,357
TRANSPARENCY WITH ORIENTATION MEANS
Paul J. Grogan, Madison, Wis., assignor to Milprint, Inc., Milwaukee, Wis., a corporation of Delaware
Filed Oct. 22, 1964, Ser. No. 405,793
4 Claims. (Cl. 40—158)

This invention relates generally to educational devices of the type often referred to as transparencies; specifically, it relates to the application of position identifying indicia to transparencies, as by printing, to permit accurate and facile orientation of a transparency through its several positions. It has particular applicability to transparent overlays wherein one transparency is to be arranged in a specified position with respect to one or more other transparencies.

Printed transparencies have received increased attention as a valuable tool for the graphical presentation of many types of information. Transparencies can be used for projected display on a screen by suitable apparatus such as an overhead projector, or for non-projected display with or without a lighted stage or other viewing apparatus. Many applications use a set of two or more transparencies which are related to one another so as to portray a sequenced development or build-up of the illustrated subject matter or other types of relationships between the several transparencies. For example, a set of transparencies may be used to show the relationships between the various mechanisms of a machine, the evolution of scientific principles, the development of mathematical theories, and many other applications too numerous to mention.

An object of this invention is to provide a new arrangement of position identifying indicia in a transparency wherein the transparency may be efficaciously oriented throughout several positions; this will facilitate changing the position of one transparency with respect to another to demonstrate changes in relationships between the information on the transparencies.

Another object is to provide position indicating means for application to a transparency which can be adapted to enable both sides of the transparency to be oriented through their several positions.

A further specific object is to provide means for orienting a transparency through several positions including a sequentially arranged position identifying indicia disposed so that only one indicium is in a normal reading postion upon rotation of the transparency to place it in a selected datum or reference position.

Briefly stated, the objects of this invention are satisfied through the provision, in a transparency comprising a sheet of material having a transparent area with information applied to part of the transparent area, of means for orienting the transparency through a plurality of positions comprising position indicating indicia sequentially spaced about the transparent area, there being one indicium for identifying each position of the transparency. Rotation of the transparency brings an indicia into a selected datum position for properly orienting the transparency into a particular position.

The foregoing and other objects will become apparent from the following description wherein several specific embodiments of this invention are described for the purposes of illustration. However, it is to be understood that other embodiments of this invention may be devised, and that structural changes in the forms described herein may be made by those skilled in the art without actually departing from the true scope of this invention. The scope of the present invention is best defined by the appended claims and, except as otherwise stated, limitations set forth in the following detailed description should be interpreted as being illustrative only. In the following description and in the claims, various structural features have been identified by specific names, relative positions or relative directions. These, however, are intended to be construed in a generic, not limited, sense. As much as possible, the same reference characters refer to like parts in the several drawings.

In the drawings:

FIG. 1 is a plan view of the front side of a transparency incorporating an orientation system in accordance with this invention;

FIG. 2 is a plan view of the reverse side of the transparency of FIG. 1;

FIG. 3 is a plan view of one side of another transparency incorporating an orientation system according to this invention;

FIG. 4 is a plan view of the transparency of FIG. 1 in a first position overlying the transparency of FIG. 3, with one corner of the top transparency folded up;

FIG. 5 is a plan view of the transparency of FIG. 1 in a second position overlying the transparency of FIG. 3, with one corner of the top transparency folded up;

FIG. 6 is a plan view of the transparency of FIG. 1 in a third position overlying the transparency of FIG. 3, with one corner of the top transparency folded up;

FIG. 7 is a plan view of the transparency of FIG. 1 in a fourth position overlying the transparency of FIG. 3, with one corner of the top transparency folded up; and FIG. 8 is a plan view of a corner portion of a transparency showing another form of a corner indexing system in accordance with the present invention.

In FIG. 1, there is illustrated the front side F of a square transparency 3 that includes an opaque border 5 surrounding an inner transparent area 6. A circle 7 is printed in the transparent area 6 at the position hereinafter set forth. The border 5 would normally be printed as a continuous opaque coating, although it can have other constructions. The transparency can be of any suitable transparent material such as clear cellulose acetate sheets, glass, various plastic films, etc.

A circle 8 is printed near each corner of the transparent area 6. Each circle 8 is bisected into halves 8a and 8b by a diagonal line 9 which lies on a diagonal of the square transparency 3. The front side F of the transparency 3 can have four positions, indicated as 3A, 3B, 3C and 3D. Identifying indicia for each of these positions is printed in one of the semi-circles 8a. Indicium 3A is printed in the upper right-hand circle 8 as shown in FIG. 1, and the other three position indicating indicia are sequentially arranged in a clockwise direction in the other semi-circles 8a so that each indicium presents the same appearance when its particular corner is placed in the upper right-hand position upon each 90° counterclockwise rotation of the transparency 3. The upper right-hand corner of the transparency as shown in FIG. 1 is used as the datum position and the other three indicia arranged at 90°, 180°, and 270°, respectively, in relation to the first indicium 3A. Thus the indicia 3B, 3C and 3D are not in their normal reading position when the transparency is displayed as in FIG. 1, but become properly arranged as the transparency is rotated to bring their respective corners into the position of that bearing 3A in FIG. 1.

The reverse side R of the transparency 3 is shown in FIG. 2, and has four possible positions, 3E, 3F, 3G and 3H. Each semi-circle 8b has indicia therein to indicate one of these positions, with position 3E in the upper right-hand position as shown in FIG. 2 and the indicia in the remaining semi-circles arranged sequentially in a clockwise direction from that bearing indicia 3E, which serves as the datum position for the reverse side R of the transparency. The indicia 3E, 3F, 3G and 3H are printed so as to be in their normal reading position when the reverse side R of the transparency 3 faces the viewer, as shown in FIG. 2. Consequently, these indicia will appear backwards to a viewer observing the front side F of the transparency 3 as illustrated in FIG. 1. Similarly, the position indicating indicia 3A, 3B, 3C and 3D will be seen in their reverse position to a viewer observing the reverse side R of the transparency 3 in the view of FIG. 2.

FIG. 3 illustrates a transparency 4, having the same construction as the transparency 3 of FIGS. 1 and 2 except that it has a circle 10 printed in its transparent area 6 that is in a different position and of a different size than the circle 7 shown in the transparency 3 of the preceding drawings. The front side F of the transparency 4 has four positions indicated as 4A, 4B, 4C and 4D. These position indicating indicia are printed in the semi-circles 8a of the position indicating circles 8 printed near each corner of the transparent area and they are arranged with respect to the upper right-hand corner of the transparency so that each can be placed in the datum corner position upon successive 90° counterclockwise rotations of the transparency. When viewed in the position shown in FIG. 3, the position indicia 4B is 90° out of its normal viewing position, 4C 180° and 4E 270°. (This relationship also obtains with transparency 3.) The reverse side of the transparency 4, not illustrated in the drawings, also has four positions indicated as 4E, 4F, 4G and 4H that are printed in the semi-circles 8b so as to be in their normal viewing position when the transparency is reversed; hence, they appear to be in a backwards or reverse position when viewed as in FIG. 3.

The center of the transparencies 3 and 4 is shown by a dot 11; this is included in the drawings for the purposes of the ensuing description and need not normally be placed on the printed transparencies. The circle 7 is placed in the transparent area of the transparency 3 according to the rectangular coordinate system using the dot 11 as the intersection of the $x$ and $y$ axes with the center of the circle at the position where $x=1$, $y=-1$, and with a radius of one unit. Using the same units and rectangular coordinate system, the circle 10 is placed on the transparent area of the transparency 4 with its center at $x=1$, $y=1\frac{1}{2}$, and with a radius equal to $1\frac{1}{2}$. This relative positioning of the two circles is for the purpose of illustrating various geometrical relationships therebetween, as described below.

In FIGS. 4–7, the transparency 3 is shown superimposed on the transparency 4 in a number of different positions with the upper right-hand corner of transparency 3 folded up so as to expose the corresponding corner of transparency 4. This was done in order to more clearly illustrate the following description, but in normal use the top transparency 3 would be flat with the upturned corner lying down.

In FIG. 4, the transparency 3 is shown overlying the transparency 4, with the front sides F of the transparencies towards the viewer and with the transparencies in their 3A and 4A positions respectively. To form this assembly, the transparency 4 is oriented with the circle 8 bearing the position indicating indicium 4A in the upper right-hand corner as shown in FIG. 4 and transparency 3 is superimposed on transparency 4 with its circle 8 bearing the position indicating indicum 3A overlying the 4A indicium. In this combination, the two transparencies illustrate a pair of circles having external tangency; that is, the circle 7 printed on transparency 3 is externally tangent to the circle 10 printed on transparency 4. The combined, overlying transparencies can be projected through an overhead projector or viewed directly against any suitable background.

When it is desired to depict a different relationship between the circles 7 and 10, the transparency 3 can be rotated so that a different position indicating indicium is placed over the 4A position of transparency 4. A second relationship is shown in FIG. 5 wherein the transparency 3 in its 3C position overlies the transparency 4 in its 4A position. This relation between the two transparencies is established by rotating transparency 3 so that its semi-circle 8a bearing the position indicating indicium 3C overlies the semi-circle 8a bearing position indicating indcum 4A of the transparency 4. The two transparencies now depict a pair of intersecting circles.

A 90° counterclockwise rotation of transparency 3 from its position shown in FIG. 5 while retaining transparency 4 in its 4A position, yields the combination shown in FIG. 6 wherein position indicating indicium 3D of transparency 3 is superposed over indicium 4A of the transparency 4. The circles 7 and 10 now illustrate a pair of disjoint circles.

Another position of transparency 3 with respect to transparency 4 is illustrated in FIG. 7. In this instance, the reverse side R of transparency 3 is placed over the front side F of transparency 4. Transparency 4 is in its 4A position and transparency 3 in its 3G position. The circles 7 and 10 now illustrate a pair of circles having internal tangency. Further rotations of the transparency 3 with its reverse side towards the viewer will produce other relationships of the two circles. In the transparencies illustrated herein, the positions 3E, 3F, 3G and 3H on the reverse side R of each transparency are repeats of the positions A, B, C, D printed on the front side F thereof. However, in an appropriate instance, the transparencies can be made with the information on the reverse side being different from that shown on the front side.

FIG. 8 shows a portion of a transparency having a particularly preferred form of the present invention. The circle 8 defines a zone and is divided into portions 8a and 8b by line 9. A position indicating indicium 3A for identifying one side of the transparency is included in one portion of the circle 8 and an indicium 3H for the opposite side is in the other portion. In portion 8a, the indicium is printed with an opaque ink and the rest of the portion is left as a transparent background. In portion 8b, the background is printed in opaque ink but the indicium is transparent. The other indicia for each side would be in similar zones. Besides the transparent and opaque contrast specifically shown, the zone portions can be contrasting by being in different colors or printed or otherwise treated to have different degrees of transparency, in either continuous or interrupted patterns such as cross-hatching, etc. This construction provides a contrasting appearance between the zone portions to facilitate quick selection of the appropriate set of indicia for one side or the other of the transparency and thereby further enhance the utility of the present invention.

The transparencies described above have each comprised a sheet of transparent material including a square transparent area and information applied to part of the transparent area. To this known article, the present invention provides a means for orienting the transparency throughout several positions by the provision of position indicating indicia spaced about the perimeter of the transparent area near each corner thereof. The indicia are sequentially arranged and printed in such a manner that each indicium will present the same appearance when the transparency is rotated to place one of the indicia in a selected datum position; in the drawings the selected datum position is the upper righthand corner of the transparent area. It can be seen that each indicium is arranged at a 90° angle to its preceding neighbor. Transparencies can incorporate the present invention by having only one surface carrying the position indicating indicia or by having the position indicating indicia on two surfaces. Where the position indicating indicia are applied to two surfaces of a transparency, one set of indicia is arranged to be in a suitable reading position when its respective side is presented to a viewer and the other set of indicia is arranged to be in a reading position when its side is presented to a viewer; in this form one set of indicia may appear reversed to a viewer looking at the opposite side of the transparency. As another feature of the present invention, zones are indicated near each corner of the transparent areas, herein illustrated as circles 8, in which the position-indicating indicia are disposed. Each zone is divided into two portions and an indicia for one side of the transparency is placed in one portion and an indicia for the opposite side of the transparency is placed in the other portion; zone portions can also be separately identified to facilitate reference to two surfaces of the transparency. The zones may have other shapes, such as squares, rectangles or hexagons. The invention can also be practiced with transparency having a transparent area other than the square configuration as shown herein, in which event there would be a plurality of position indicating indicia sequentially spaced about the perimeter of the transparent area with one indicium for each position of the transparency.

The transparency orienting means of the present invention facilitates the rotation of a transparency throughout its several positions. A viewer can be certain that he is viewing transparency in its proper orientation for each position since only the position indicating indicia for that position will appear in the proper reading position to him; the others will appear to be out of the normal viewing position. This arrangement of the indicia further facilitates the orientation of one transparency with respect to one or more other transparencies, each bearing different information. Consequently, transparencies incorporating the orientation means of the present invention are particularly useful as a teaching tool in that they lend themselves to sets of separate transparencies in which it is desired to superimpose two or more transparencies for a combined display of their information. Printed instructions for the use of such a set of transparencies would include a key showing the various relationships that can be displayed through the various combinations of transparencies so that the teacher can rapidly select his desired combinations. For example, a keyed instruction of this type relating to the combination shown in FIG. 7 may simply read: "3B/4A—Internally Tangent Circles." This would indicate to the teacher that he should superimpose transparency 3 over transparency 4 with the 3B position indicia of the former on top of the 4A indicia of the latter and both in a normal reading position. Being able to orient the various transparencies through several positions in this manner can reduce the total number of transparencies required in the sets while still permitting display of a full range of information. At the same time, the teacher has a check on the accuracy of his selection in that the indicium 3B and 4A would be the only two on their respective transparencies that would appear to him to be in a normal reading position.

It is to be understood that it is intended to cover all changes and modifications of the examples of this invention herein chosen for the purposes of illustration which do not constitute a departure from the spirit and scope of this invention.

I claim:

1. In a transparency comprising a sheet of material including a square transparent area and information applied to part of the transparent area, the combination with said transparency of means for orienting the transparency through a plurality of positions; said means comprising a set of four sequentially arranged position indicating indicia spaced about the perimeter of the transparent area, there being a first position indicating indicium near one corner of the transparent area arranged parallel to a side of said area, a second position indicating indicium near another corner of the transparent area arranged at 90° to said first indicium, a third position indicating indicium near another corner of the transparent area arranged at 90° to said second indicium, and a fourth position indicating indicium near another corner of the transparent area arranged at 90° to said third indicium; one corner of the transparent area being a datum position and each indicium being further arranged to present the same appearance when in the datum position upon rotation of the transparency.

2. A transparency according to claim 1 including two sets of position indicating indicia, one set identifying one side of the transparent area and the second set identifying a second side of the transparent area, and with each set arranged to be in viewing position when its respective side is presented to a viewer of the transparency.

3. In a transparency comprising a sheet of material including a square transparent area and information applied to part of the transparent area, the combination with said transparency of means for orienting the transparency through a plurality of positions; said means comprising a zone defined near each corner of the square transparent area and divided into two portions, and two sets of position indicating indicia sequentially disposed in said zones; one of said sets of indicia indicating positions of a first side of the transparent area and the other set of indicia indicating positions of a second side of the transparent area; each set of indicia comprising a first position indicating indicium near one corner of the transparent area arranged parallel to a side of said area, a second position indicating indicium near another corner of the transparent area arranged at 90° to said first indicium, a third position indicating indicium near another corner of the transparent area arranged at 90° to said second indicium, and a fourth position indicating indicium near another corner of the transparent area arranged at 90° to said third indicium; one indicium from said first set being arranged in a portion of each of said zones and one indicium from said second set being arranged in the other portion of each of said zones; the first set of indicia being in reading position when the first side is presented to a viewer of the transparency and the second set of indicia being in reading position when the second side is presented to a viewer of the transparency; and one corner of each side of the transparent area being a datum position and each indicium being further arranged to present the same appearance when in the datum position upon rotation of the transparency.

4. In a transparency comprising a sheet of material including a square transparent area and information applied to part of the transparent area, the combination with said transparency of means for orienting the transparency through a plurality of positions; said means comprising a zone defined near each corner of the square transparent area and divided into two portions, and two sets of position indicating indicia sequentially disposed in said zones; one of said sets of indicia indicating positions of a first side of the transparent area and the other set of indicia indicating positions of a second side of the transparent area; each set of indicia comprising a first position indicating indicium near one corner of the transparent area arranged parallel to a side of said area, a second position indicating indicium near another corner of the transparent area arranged at 90° to said first indicium, a third position indicating indicium near another corner of the transparent area arranged at 90° to said second indicium, and a fourth position indicating indicium near another corner of the transparent area arranged at 90° to said third indicium; one indicium from said first set being arranged in a portion of each of said zones and one indicium from said second set being arranged in the other portion of the zone portions containing the other set of indicia; the first set of indicia being in reading position when the first side is presented to a viewer of the transparency and the second set of indicia being in reading position when the second side is presented to a viewer of the transparency; one corner of each side of the transparent area being a datum position and each indicium being further arranged to present the same appearance when in the datum position upon rotation of the transparency.

References Cited

UNITED STATES PATENTS

| | | | |
|---|---|---|---|
| 407,515 | 7/1889 | Duffield | 33—1 |
| 2,421,813 | 6/1947 | Staghezza | 33—1 |
| 3,028,785 | 4/1962 | Leach | 88—24 |

EUGENE R. CAPOZIO, *Primary Examiner.*

W. J. CONTRERAS, *Assistant Examiner.*